(12) United States Patent
Wetzig

(10) Patent No.: US 10,935,453 B2
(45) Date of Patent: Mar. 2, 2021

(54) LEAK DETECTION WITH OXYGEN

(71) Applicant: INFICON GmbH, Cologne (DE)

(72) Inventor: Daniel Wetzig, Cologne (DE)

(73) Assignee: INFICON GmbH, Cologne (DE)

( * ) Notice: Subject to any disclaimer, the term of this patent is extended or adjusted under 35 U.S.C. 154(b) by 224 days.

(21) Appl. No.: 15/776,299

(22) PCT Filed: Nov. 11, 2016

(86) PCT No.: PCT/EP2016/077414
§ 371 (c)(1),
(2) Date: May 15, 2018

(87) PCT Pub. No.: WO2017/084974
PCT Pub. Date: May 26, 2017

(65) Prior Publication Data
US 2018/0328810 A1 Nov. 15, 2018

(30) Foreign Application Priority Data
Nov. 16, 2015 (DE) ...................... 10 2015 222 554.2

(51) Int. Cl.
*G01M 3/22* (2006.01)
*G01M 3/32* (2006.01)
*G01F 17/00* (2006.01)

(52) U.S. Cl.
CPC ............. *G01M 3/229* (2013.01); *G01F 17/00* (2013.01); *G01M 3/3263* (2013.01); *G01M 3/3281* (2013.01)

(58) Field of Classification Search
CPC ........................... G01M 3/229; G01M 3/3263
See application file for complete search history.

(56) References Cited

U.S. PATENT DOCUMENTS

| | | | |
|---|---|---|---|
| 5,170,660 A | 12/1992 | Lehmann | |
| 5,929,328 A | 7/1999 | Seidenfuss | |
| 7,156,976 B2 | 1/2007 | Bley | |
| 2003/0047465 A1 | 3/2003 | Grosse Bley | |
| 2004/0040372 A1* | 3/2004 | Plester | ............... G01N 15/0826 73/38 |
| 2009/0100909 A1 | 4/2009 | Grosse Bley et al. | |
| 2013/0025349 A1* | 1/2013 | Solomon | ................ G01M 3/22 73/40.7 |

(Continued)

FOREIGN PATENT DOCUMENTS

| | | |
|---|---|---|
| DE | 10240295 A1 | 4/2004 |
| JP | H1183790 A | 3/1999 |
| JP | 2011179975 A | 9/2011 |

(Continued)

*Primary Examiner* — Paul M. West
*Assistant Examiner* — Mark A Shabman
(74) *Attorney, Agent, or Firm* — The Webb Law Firm

(57) ABSTRACT

A method for detecting a leak in a test object, including inserting the test object into a test chamber; filling the test object with a test gas; and adjusting a pressure in the test chamber and a pressure in the test object such that the test chamber pressure is lower than the test object pressure. The test chamber contains air and the test object is filled exclusively with a gas containing no molecules with oxygen atoms. In order to detect a leak in the test object, an oxygen proportion of the air in the test chamber is measured with an oxygen sensor.

14 Claims, 1 Drawing Sheet

(56) References Cited

U.S. PATENT DOCUMENTS

2015/0211955 A1* 7/2015 Bounouar ............ G01M 3/223
73/49.3
2015/0226629 A1 8/2015 Murthy

FOREIGN PATENT DOCUMENTS

| | | |
|---|---|---|
| JP | 2015040836 A | 3/2015 |
| WO | 0144775 A1 | 6/2001 |
| WO | 2006032591 A1 | 3/2006 |
| WO | 2014016308 A1 | 1/2014 |
| WO | 2014038192 A1 | 3/2014 |

* cited by examiner

LEAK DETECTION WITH OXYGEN

CROSS-REFERENCE TO RELATED APPLICATIONS

This application is the United States national phase of International Application No. PCT/EP2016/077414 filed Nov. 11, 2016, and claims priority to German Patent Application No. 10 2015 222 554.2 filed Nov. 16, 2015, the disclosures of which are hereby incorporated in their entirety by reference.

BACKGROUND OF THE INVENTION

Field of the Invention

The disclosure relates to a method and a device for the detection of a leak in a test object contained in a test chamber.

Description of Related Art

For testing the tightness of objects using a test gas, typically the filling gas in the object, which is present for operational reasons, is used for analysis, such as e.g. a cooling medium in the heat exchanger of a refrigerator or an air condition system. On the other hand, the object to be tested is filled with a test gas, e.g. the test gas helium. Three different approaches are used to detect the escaping test gases.
1. Vacuum Leak Detection
2. Accumulation
3. Carrier Gas Method For a vacuum leak detection, the partial pressure of the test gas is measured in the vacuum system and serves as the measure for the leakage rate.

For an accumulation, the test object is located in a closed measuring chamber volume and the temporal development of the increase in the partial pressure of the test gas in the measuring chamber serves as the measure for the leakage rate.

For the carrier gas method, a carrier gas flows around the test object. The gas flowing past the test object carries gas escaping from the test object to the measuring site, where a corresponding test gas sensor measures the test gas concentration in the carrier gas. The difference between the test gas concentration in the carrier gas with and without a test object serves as the measure for the leakage rate.

Measuring tasks exist that cannot be accomplished using simple methods of tightness testing, such as e.g. the pressure-drop method. However, the costs for a system that allows the use of the test gas helium are or seem to be too high. Likewise, the availability of helium and its costs are not stable. It is desirable to be able to use alternative test gases.

When choosing a suitable test gas for tightness tests, it has to be taken into consideration how high and stable the partial pressure is in the test environment. Actually, oxygen is less suited as a test gas, since it exists in a proportion of about 21% in the atmosphere.

However, this proportion of ca. 21% can be measured in a very precise and at the same time simple manner using a lambda probe. For safety-related reasons, however, the test object cannot be filled with pure oxygen for test purposes.

A method is known from WO 2001/044775 A1, in which oxygen partial pressure is measured to localize a leak in a test object. In a first variant the test object is evacuated and sprayed with an oxygen-free gas from outside using a spray gun. The oxygen partial pressure is measured in the vacuum of the test object. In a second variant the test object is filled with an oxygen-free gas and subjected to an overpressure relative to the outer atmospheric pressure. Escaping gas is sucked in using a sniffer probe and is supplied to a vacuum chamber which holds an oxygen sensor. In a third variant the test object is filled with an oxygen-containing gas and is introduced into a test chamber which is then evacuated. The oxygen partial pressure is measured in the vacuum of the test object. In all variants described, the proportion of oxygen is measured in vacuum. It has been shown that vacuum conditions at the oxygen sensor cause significant signal drift and that the measuring signal is difficult to evaluate.

SUMMARY OF THE INVENTION

It is an object of the present disclosure to provide an improved method and an improved device for leak detection at a test object in a test chamber.

According to the disclosure, the test object is filled, as exclusively as possible, with an oxygen-free gas, such as e.g. nitrogen or argon, whereas the environment of the test object within the test chamber contains air. The pressure in the test object and in the test chamber is adjusted such that the pressure in the test object is higher than the pressure in the test chamber in the area outside the test object. In case of a leak in the test object, the oxygen-free gas escapes from the test object and reduces the oxygen concentration in the atmosphere surrounding the test object. The decrease in oxygen concentration serves as a measure for the leakage rate.

The oxygen concentration is measured using an oxygen sensor, e.g. in form of a lambda probe. The measuring may be performed according to the accumulation method or the carrier gas method.

It is decisive that the oxygen partial pressure or the partial pressure of oxygen-containing gases, such as $CO_2$, at the lambda probe is sufficiently high and is not measured under vacuum conditions. Sufficiently high pressure is understood as an oxygen partial pressure of about 10 mbar or higher, corresponding to an atmospheric pressure of about 50 mbar or higher. In this pressure range, the measuring signal of a lambda probe is particularly informative, whereas, under vacuum conditions at a pressure $p \ll 10$ mbar, the signal is not useful. In this regard, the lambda probe may be arranged e.g. downstream of a pump evacuating the test chamber or of a compressor. A sniffer probe or a spray gun is not used. A complete evacuation of the test chamber is not necessary, as is the case in the above described variant 3 in WO 2001/044775 A1. There, the test object is filled with an oxygen-containing gas. Only in case of a sufficient evacuation of the test chamber is a measurement of the oxygen partial pressure informative, since oxygen may reach the test chamber only in case of a leak in the test object. If, alternatively, the test chamber is flooded with an oxygen-free gas, while the test object is filled with an oxygen-containing gas, as also described in WO 2001/044775 A1, a lot more oxygen-free gas is required than in the method of the present disclosure.

The operation of a lambda probe in oxygen-free gas leads to a drifting signal just as in an operation under vacuum conditions.

An operation of the oxygen sensor (lambda probe) in a pure $CO_2$ atmosphere is also conceivable. An operation in pure nitrogen or pure argon, however, is not practicable.

In case of a $CO_2$ atmosphere in the test object environment inside the test chamber, the test object is filled with an oxygen proportion (e.g. air) and the increase in oxygen in the test object environment is measured.

Filling the test object with an oxygen-free gas, while the test chamber contains air, has the advantage, in combination with the measuring of the oxygen concentration at atmospheric pressure, that the test chamber does not have to be evacuated completely. Rather, a slight depression relative to atmospheric pressure or even atmospheric pressure in the test chamber will be sufficient. The pressure difference to the oxygen-free gas in the test object merely has to be sufficiently great. To this end, the test object has to be pressurized to a sufficient overpressure.

In the accumulation method, the temporal development of a possible increase in the oxygen partial pressure in the air of the test chamber is measured and serves as a measure for the leakage rate.

In the carrier gas method air flows around the test object as a carrier gas, while an oxygen sensor measures the oxygen concentration in the carrier gas downstream of the test object. Here, the difference between the oxygen concentration in the carrier gas air both with and without a test object serves as the measure for the leakage rate. For a determination of the oxygen concentration in the carrier gas without a test objet, another oxygen sensor may be arranged upstream of the test object in the gas flow path to the test chamber.

In the case of the carrier gas method, a constant oxygen concentration develops which is a reduced concentration depending on the leakage. When measuring the change in the oxygen concentration in the air by admixed oxygen-free leakage gas, the oxygen proportion in the air upstream of the test object or prior to the admixture of the oxygen-free leakage gas must be maintained stable. This may be realized via a buffer or equalization volume with an additional throttle as a low pass.

In case of a measuring according to the accumulation method, the decrease in oxygen concentration is measured over time.

Preferably, the total pressure of the gas in the test chamber and/or at the oxygen sensor is stabilized, so as to enhance the detection limit.

The quantity of gas in the test chamber volume is to be kept small. This may be achieved by lowering the total pressure in the test chamber volume or by reducing the net volume (test chamber inner volume minus the test object outer volume).

The disclosure has the advantage that no expensive test gases have to be used. Oxygen-free process gases, such as e.g. argon or nitrogen, are well available and cheap. The costs for an oxygen sensor are low, in particular in case of a lambda probe available as a mass product from the automobile industry. The measuring accuracy is enhanced relative to the pressure drop method or relative to the pressure increase method. The effort related to vacuum technology is low compared to a helium vacuum test.

BRIEF DESCRIPTION OF THE DRAWINGS

The following is a detailed explanation of two embodiments with reference to the Figures. In the Figures.

DESCRIPTION OF THE INVENTION

Figure 1:
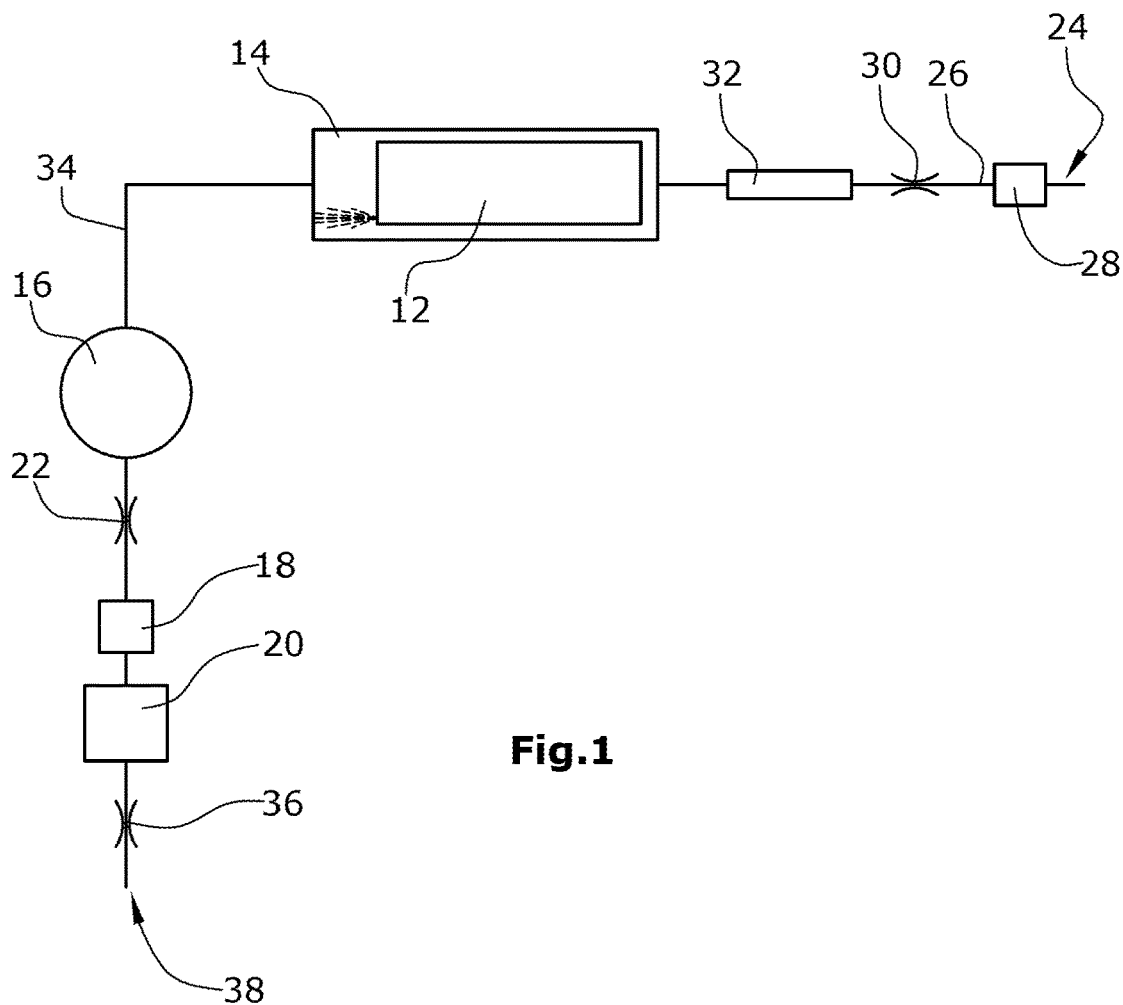
FIG. 1 is a schematic illustration of the first embodiment.

In both embodiments, the test object 12 is filled completely with an oxygen-free test gas, so that no oxygen is contained in the test object. Thereafter or before, the test object is placed in a hermetically sealable test chamber 14. The test chamber 14 contains air.

The test chamber is gas-conductively connected to a carrier gas pump 16 or, alternatively, to a compressor. In a corresponding manner, the test chamber 14 is gas-conductively connected to an oxygen sensor 18 in the form of a lambda probe.

The oxygen sensor 18 and the carrier gas pump 16 are in communication through a gas path in which a throttle 22 is provided.

The embodiment in FIG. 1 is an arrangement for measurement according to the carrier gas method. Air is supplied to the test chamber 14 as a carrier gas via the carrier gas inlet 24 and a first has path 26 connecting the carrier gas inlet 24 and the test chamber 14. A further oxygen sensor 28, in particular in the form of a lambda probe, can be provided in the gas path, so as to determine the oxygen offset, i.e. the oxygen proportion contained in the air without test gas being added thereto from the test object 12.

The gas path 26 further includes another flow throttle 30 and a flow sensor 32. The side of the test chamber 14 opposite the gas path 26 is connected to an outlet gas path 34 which includes the carrier gas pump 16, the throttle 22, the oxygen sensor 18, the buffer volume 20 and a third throttle 36 and leads to the gas outlet 38.

Using the carrier gas pump 16, the air is guided from the inlet 24 through the test chamber 14 along the surface of the test object 12 and is supplied to the oxygen sensor 18. In case of a leak in the test object 12, oxygen-free gas escapes from the test object 12 and mixes with the air of the carrier gas, whereby the oxygen proportion in the air is reduced. This oxygen proportion is measured with the lambda probe (oxygen sensor 18).

Figure 2:
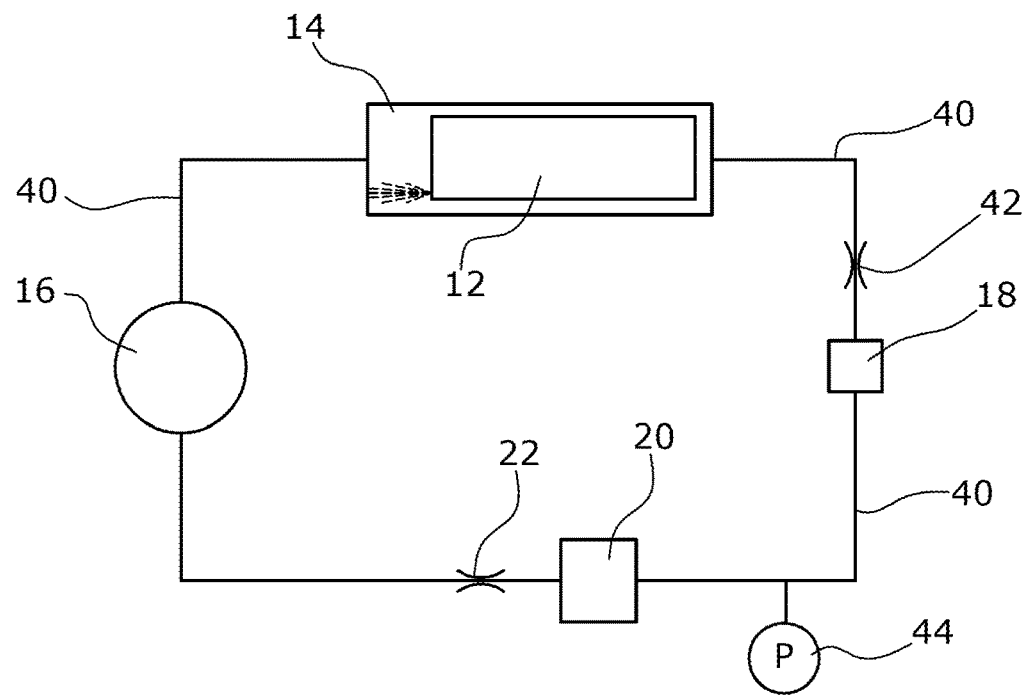
FIG. 2 is a schematic illustration of the second embodiment.

The second embodiment illustrated in FIG. 2 is provided for measurement according to the accumulation method. A gas path 40 connects two opposite sides of the test chamber 14. The gas path 40 includes the carrier gas pump 16, the throttle 22, the buffer volume 20, a total pressure sensor 44, the oxy-gen sensor 18 (lambda probe) and a further throttle between the oxygen sen-sor 18 and the test chamber 14. The two throttles 42 and 22 are arranged on opposite sides of the oxygen sensor 18. The total pressure sensor 44 may be a differential total pressure sensor that measures the differential pressure with respect to the atmospheric ambient pressure.

Using the carrier gas pump 16, the pressure in the test chamber 14 is reduced in the area outside the test object 12 such that the oxygen-free gas in the test object 12 flows from a possible leak of the test object into the test chamber 14. The oxygen sensor 18 is used to continuously measure the oxygen partial pressure of the air in the test chamber 14. Specifically, the change in the oxygen partial pressure is measured over time, wherein a decrease of the oxygen concentration indicates a leak in the test object 12 and serves as a measure for the leakage rate.

The total pressure sensor 44 serves to enable the determination of the oxygen concentration from the oxygen partial pressure signal of the lambda probe and the measured total pressure. The oxygen concentration $C_{O2}$ is the quotient of the oxygen partial pressure $P_{O2}$ and the measured total pressure $P_{tot}$:

$$C_{O2}=P_{O2}/P_{tot}.$$

While various embodiments of the disclosure are provided in the foregoing description, those skilled in the art may make modifications and alterations to these embodiments without departing from the scope and spirit of the disclosure. For example, it is to be understood that this disclosure contemplates that, to the extent possible, one or more features of any embodiment can be combined with one or more feature of any other embodiment. Accordingly, the foregoing description is intended to be illustrative rather than restrictive. The disclosure described above is defined by the appended claims and all changes to the disclosure that fall within the meaning and the range of equivalency of the claims are to be embraced within their scope.

The invention claimed is:

1. A method for detecting a leak in a test object, said method comprising the following steps:
   inserting the test object into a test chamber;
   filling the test object with a test gas; and
   adjusting a pressure in the test chamber and a pressure in the test object such that the test chamber pressure is lower than the test object pressure,
   wherein the test chamber contains air and the test object comprises a gas which does not include any oxygen molecules, wherein, in order to detect a leak in the test object, the oxygen proportion of the air in the test chamber is measured with an oxygen sensor, wherein a reduction of the oxygen concentration within the test chamber is used as a measure for a leakage rate, and
   wherein upon measuring the oxygen proportion, a temporal development of a change in an oxygen partial pressure in the test chamber is measured according to an accumulation approach.

2. The method of claim 1, wherein the oxygen sensor is a lambda probe.

3. The method of claim 1, wherein air flows as a carrier gas around the test object in the test chamber and a change in oxygen concentration in the carrier gas is measured according to a carrier gas method.

4. The method of claim 3, wherein variations in the oxygen proportion in the air flowing around the test object is reduced using a buffer volume and a throttle.

5. The method of claim 1, wherein a total pressure of the air at the oxygen sensor is maintained stable to lower a detection limit.

6. The method of claim 1, wherein a quantity of the gas in the test chamber is kept smaller than the gas quantity in the test object.

7. A method for detecting a leak in a test object, said method comprising the following steps:
   inserting the test object into a test chamber;
   filling the test object with a test gas; and
   adjusting a pressure in the test chamber and a pressure in the test object such that the test chamber pressure is lower than the test object pressure,
   wherein the test chamber comprises a gas which does not include any oxygen molecules and the test object contains air, wherein, for the detection of a leak in the test object, the oxygen proportion in an atmosphere inside the test chamber is measured using an oxygen sensor, wherein an increase in the oxygen concentration within the test chamber is used as a measure for a leakage rate, and
   wherein upon measuring the oxygen proportion, a temporal development of a change in an oxygen partial pressure in the test chamber is measured according to an accumulation approach.

8. The method of claim 7, wherein the gas which does not include any oxygen molecules is carbon dioxide.

9. A device for detecting a leak in a test object comprising a gas which does not include any oxygen molecules, the device comprising a test chamber receiving the test object, a gas pump or compressor connected to the test chamber and a gas sensor connected to the test chamber, wherein the gas sensor is an oxygen sensor and the test chamber contains air, wherein a reduction of the oxygen concentration within the test chamber is used as a measure for a leakage rate, and
   wherein upon measuring the oxygen proportion, a temporal development of a change in an oxygen partial pressure in the test chamber is measured according to an accumulation approach.

10. The device of claim 9, wherein a gas path between the pump or the compressor and the oxygen sensor comprises a buffer volume for pressure surge damping.

11. The device of claim 10, wherein the oxygen sensor is located on a first side of the test chamber, and wherein on a second side of the test chamber opposite the first side, the gas path connected to the test chamber comprises an additional oxygen probe.

12. A device for detecting a leak in a test object containing air, the device comprising a test chamber receiving the test object, a gas pump or compressor connected to the test chamber, and a gas sensor connected to the test chamber, wherein the gas sensor is an oxygen sensor, and the test chamber comprises a gas which does not include any oxygen molecules, wherein an increase in the oxygen concentration within the test chamber is used as a measure for a leakage rate, and
   wherein upon measuring the oxygen proportion, a temporal development of a change in an oxygen partial pressure in the test chamber is measured according to an accumulation approach.

13. The device of claim 12, wherein a gas path between the pump or the compressor and the oxygen sensor comprises a buffer volume for pressure surge damping.

14. The device of claim 13, wherein the oxygen sensor is located on a first side of the test chamber, and wherein on a second side of the test chamber opposite the first side, the gas path connected to the test chamber comprises an additional oxygen probe.

* * * * *